(12) United States Patent
Weyand et al.

(10) Patent No.: US 7,048,779 B1
(45) Date of Patent: May 23, 2006

(54) METHOD OF REMOVING MERCURY FROM EXHAUST GASES OF COAL FIRED POWER PLANTS AND ASSOCIATED APPARATUS

(75) Inventors: Thomas Weyand, New Brighton, PA (US); Dale Nickels, Ambridge, PA (US); Michael Sawayda, McKees Rocks, PA (US)

(73) Assignee: Pittsburgh Mineral and Environmental Technology, Inc., New Brighton, PA (US)

( * ) Notice: Subject to any disclaimer, the term of this patent is extended or adjusted under 35 U.S.C. 154(b) by 182 days.

(21) Appl. No.: 10/720,589

(22) Filed: Nov. 24, 2003

(51) Int. Cl.
  *B01D 53/06* (2006.01)
  *B01D 53/64* (2006.01)
  *B01D 53/75* (2006.01)

(52) U.S. Cl. .............. 95/58; 95/63; 95/68; 95/70; 95/107; 95/134; 95/148; 96/55; 96/74; 96/134; 96/143; 96/150

(58) Field of Classification Search .............. 95/58, 95/63, 68–70, 72, 107, 134, 148; 96/27, 96/57, 58, 74, 130, 134, 136, 142–144, 55, 96/150; 423/210
See application file for complete search history.

(56) References Cited

U.S. PATENT DOCUMENTS

| | | | |
|---|---|---|---|
| 3,485,014 A * | 12/1969 | Atsukawa et al. ............ 95/110 |
| 4,006,066 A * | 2/1977 | Sparwald .................... 205/391 |
| 4,889,498 A | 12/1989 | Mizuta |
| 4,889,698 A * | 12/1989 | Moller et al. ............... 423/210 |
| 4,956,162 A * | 9/1990 | Smith et al. ........... 423/244.07 |
| 5,024,681 A * | 6/1991 | Chang ......................... 95/70 |
| 5,069,689 A * | 12/1991 | Goldhaar ....................... 95/93 |
| 5,403,365 A * | 4/1995 | Merriam et al. ............. 44/621 |
| 5,409,522 A | 4/1995 | Durham |
| 5,419,884 A * | 5/1995 | Weekman et al. .......... 423/210 |
| 5,439,508 A * | 8/1995 | Mayer-Schwinning et al. 95/58 |
| 5,505,766 A | 4/1996 | Chang |
| 5,569,436 A * | 10/1996 | Lerner ....................... 422/170 |
| 5,672,323 A | 9/1997 | Bhat |
| 5,723,099 A * | 3/1998 | Steinke et al. .............. 423/210 |
| 5,822,352 A | 10/1998 | Mizutani et al. |
| 5,854,173 A * | 12/1998 | Chang et al. ................ 502/417 |
| 6,027,551 A | 2/2000 | Hwang et al. |
| 6,097,011 A | 8/2000 | Gadkaree et al. |
| 6,103,205 A | 8/2000 | Wojtowicz et al. |
| 6,284,199 B1 * | 9/2001 | Downs et al. .............. 422/168 |
| 6,346,936 B1 | 2/2002 | Murayama et al. |

(Continued)

*Primary Examiner*—Robert A. Hopkins
(74) *Attorney, Agent, or Firm*—Arnold B. Silverman; Lee Kim; Eckert Seamans Cherin & Mellott, LLC

(57) ABSTRACT

A method of removing mercury from a coal fired power plant exhaust gas includes passing the exhaust gas through a bulk particle filter to remove coarse particles, introducing powdered activated carbon into the exhaust gas downstream of the bulk particle filter, introducing mercury laden powdered activated carbon containing exhaust gas into a fine particle filter to separate the mercury containing powdered activated carbon from the exhaust gas, separating the powdered activated carbon from the mercury at an elevated temperature in an inert gas environment and recirculating the separating powdered activated carbon into the exhaust gas upstream from the fine particle filter. The desorption is preferably effected at a temperature of about 300 to 500° C. for about 5 to 60 minutes. The method is adapted to remove mercury which may be on the order of about 1 to 1000 ppm to 1 to 10 micrograms/cubic meter of exhaust gas. Corresponding apparatus is provided.

25 Claims, 1 Drawing Sheet

U.S. PATENT DOCUMENTS

| | | |
|---|---|---|
| 6,506,235 B1 * | 1/2003 | Gertner-Hansen ............ 95/107 |
| 6,521,021 B1 * | 2/2003 | Pennline et al. .............. 95/134 |
| 6,558,642 B1 | 5/2003 | El-Shoubary et al. |
| 6,582,497 B1 | 6/2003 | Maes et al. |
| 6,589,318 B1 | 7/2003 | El-Shoubary et al. |
| 6,719,828 B1 * | 4/2004 | Lovell et al. ................. 95/134 |
| 6,818,043 B1 * | 11/2004 | Chang et al. ................... 95/37 |
| 2002/0033097 A1 | 3/2002 | El-Shoubary et al. |
| 2002/0124725 A1 * | 9/2002 | Chang et al. ................. 95/107 |
| 2003/0206843 A1 * | 11/2003 | Nelson ........................ 423/210 |
| 2004/0003716 A1 * | 1/2004 | Nelson ........................ 95/134 |
| 2005/0132880 A1 * | 6/2005 | Chang ........................... 95/63 |

* cited by examiner

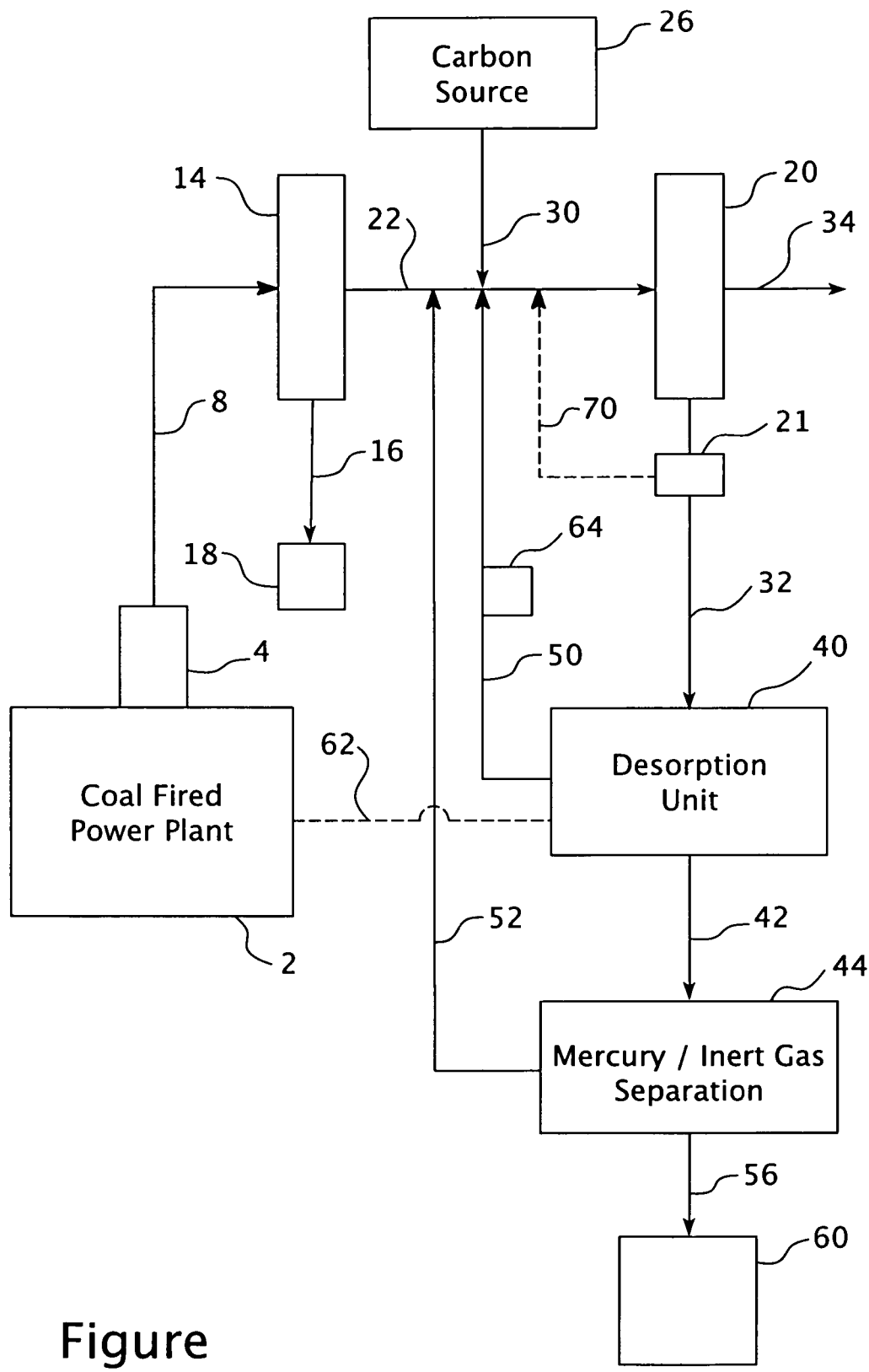
Figure

METHOD OF REMOVING MERCURY FROM EXHAUST GASES OF COAL FIRED POWER PLANTS AND ASSOCIATED APPARATUS

BACKGROUND OF THE INVENTION

1. Field of the Invention

The present invention relates to an improved method and associated apparatus for employing powdered activated carbon in withdrawing mercury from exhaust gases in coal fired power plants with subsequent desorption permitting reuse of the powdered activated carbon in the separation process or, if desired when spent, as a contribution to fuel. More specifically, the present invention relates to an initial filtering stage removing coarse particles followed by introduction of powdered activated carbon which is separated from the exhaust gas in a fine particle filter to permit subsequent elevated temperature desorption to separate the mercury and inert gas from the powdered activated carbon.

2. Description of the Prior Art

It has been known to employ various means to separate both particulate and gaseous components of coal fired power plants before discharge of the exhaust gas to the atmosphere. For example, it has been known to employ electrostatic precipitators as well as bag houses and other forms of filtration.

It has been known to purify a carbon-containing adsorption medium for treating a flue gas with subsequent regeneration and reusing or burning of the absorption medium which is said to be in the form of pellets, lumps or granules. See U.S. Pat. No. 5,409,812.

It has been known to add a carbon-containing absorbent to a gas stream with an objective being recovery of mercury. See, generally, U.S. Pat. Nos. 4,889,698; 5,409,812; 5,505,766; 5,672,323; 5,827,352; 6,027,551; 6,558,642; 6,582,497; and 6,589,318; as well as published United States patent applications 20020033097 and 20020124725.

It has also been known to inject activated carbon into a flue gas treatment system having an electrostatic precipitator and a wet flue gas desulphurization tower to remove mercury. See U.S. Pat. No. 5,672,323.

It has also been known to remove fly ash through a coarse particle filter as well as the use of fine particle removal devices. See, generally, U.S. Pat. Nos. 4,889,698; 5,409,522; 5,409,812; 5,672,323; 5,827,352; and 6,027,551.

U.S. Pat. No. 6,589,318 discloses catching the sorbent in a fine particle separator.

Desorption of mercury from a sorbent in various environments employing carbon base sorbents, as well as other approaches, has been known. See, generally, U.S. Pat. Nos. 6,346,936; 6,103,205; 6,097,011. It has also been known to effect desorption in an inert or oxygen-free atmosphere. See, generally, U.S. Pat. Nos. 6,346,936; 6,097,011; and 6,027,551.

U.S. Pat. No. 5,409,812 discloses desorbing mercury from mercury-bearing powdered activated carbon using an undisclosed desorption gas and reusing the treated powder activated carbon.

In spite of the foregoing disclosures, there remains a very real and substantial need to provide an improved method and associated apparatus for removing mercury from coal fired power plant exhaust gas in an efficient unburdensome and safe manner.

SUMMARY OF THE INVENTION

The present invention has met the above described needs. The method of the present invention includes passing the exhaust gas through a bulk particle collection device to remove coarse particles, introducing powdered activated carbon into the exhaust gas downstream of the bulk particle collection device and introducing the powdered activated carbon into the exhaust gas. The powdered activated carbon picks up mercury in the exhaust gas and is then introduced into a fine particle filter in order to separate the mercury containing powdered activated carbon from the exhaust gas. Separation of the powdered activated carbon from the mercury and inert gas is effected at an elevated temperature in an inert gas environment followed by recirculating of the separated powdered activated carbon into the exhaust gas at a position upstream from the fine particle filter. Desorption is preferably effected at a temperature of about 300 to 500° C. in a continuous process.

The method is suitable for use in, but not limited to, a system having trace amounts of mercury which may be on the order of about 1 to 1000 ppm to about 1–10 micrograms/$m^3$. The apparatus provides the preliminary bulk particle collection device which may be employed to remove ash followed by the carbon source introduction to blend the exhaust gas with the powdered activated carbon with subsequent introduction into a fine particle filter which separates the mercury containing powdered activated carbon for introduction into a desorption unit for elevated temperature separation of the powdered activated carbon for reintroduction into the exhaust gas intermediate the bulk particle collection device and the fine particle filter with the mercury and inert gas being delivered to a further separation unit wherein the mercury is separated from the inert gas which is then reintroduced into the exhaust gas stream.

It is an object of the present invention to provide a method and associated apparatus for removing mercury from coal-fired power plant exhaust gas in such a manner that permits reuse of the powdered activated carbon thereby avoiding the need to dispose of the same.

It is another object of the present invention to provide such a system for recovery of mercury from the powdered activated carbon to facilitate efficient safe handling of the mercury.

It is another object of the present invention to provide such a system wherein the powdered activated carbon may either be reused for further separation or be employed as a fuel supporting combustion in the coal fired power plant.

It is a further object of the present invention to provide such a system which will function efficiently on trace quantities of mercury.

These and other objects of the invention will be more fully understood on reference to the figure appended hereto.

BRIEF DESCRIPTION OF THE DRAWING

The figure is a schematic illustration of a preferred embodiment of the apparatus and an associated method of the present invention.

DESCRIPTION OF THE PREFERRED EMBODIMENTS

As employed herein, the term "bulk particle collection device" means a filtration device employed to remove the bulk of the particles contained in the flue gas stream. The term will expressly include, but not be limited to, mechanical filters and electrostatic precipitators. Removal efficiencies for these devices are typically about 85–95% of the contained particles. The particles not removed are typically <5 microns in diameter.

As employed herein, the term "fine particle filter" will refer to filters restricting the passage of particles having a maximum dimension of about 2 microns therethrough.

Referring to the Figure, it will be seen that a coal fired power plant 2 has an exhaust stack 4 which emits exhaust gases 8. A bulk particle collection device 14 filters out coarse particles such as ash which is delivered through conduit 16 to ash receiving receptacle 18. A fine particle filter 20 is located downstream from the bulk particle collection device 14 and receives the exhaust gas stream 22 emerging from bulk particle collection device 14. A carbon source 26, which is a source of powdered activated carbon delivers the powdered activated carbon through channel 30 to intermix with the exhaust gas 22 prior to the blended stream entering fine particle filter 20. The exhaust gas which will contain mercury, which may be on the order of trace amounts such as about 1 to 1000 ppm to 1 to 10 micrograms/cubic meter of exhaust gas, enters the fine particle filter 20 and has the mercury containing powdered activated carbon 32 separated from the remaining exhaust gas 34.

The combined mercury containing inert gas stream 32 then passes through receiver 21 and enters desorption unit 40. The desorption unit 40 in the presence of an inert gas which should be a nonoxidizing gas and is preferably nitrogen, although other suitable inert gases such as argon, helium and other nonoxidizing gas mixtures may be employed is subjected to desorption at a temperature of about 300 to 500° C., preferably for about 5 to 60 minutes. The mercury and inert gas emerges through conduit 42 and enters mercury/inert gas separator 44. The separated powdered activated carbon passes through conduit 50 to return to exhaust gas stream 22 between filters 14 and 20. The desorbed powdered activated carbon preferably passes through a cooling unit 64 prior to reintroduction into the exhaust gas stream.

The inert gas that is separated from the mercury in separation unit 44 passes through conduit 52 to be reintroduced into exhaust gas 22 and the mercury passes through conduit 56 for collection in receptacle 60. The inert gas 52 is introduced upstream of the powdered carbon introduction 30, 50.

If the powdered activated carbon is deemed to be exhausted or otherwise unsuited for continued recycling, it may be passed as through dashed line conduit 62 to the combustion chamber of the coal fired power plant for use as a fuel source.

It will also be appreciated that, if desired, the mercury containing powdered activated carbon emerging from fine particle filter 20 and entering receiver 21 may be reintroduced to gas stream 22 through conduit 70.

It will be appreciated that the present system has the bulk particle collection device 14 removing substantially all of the ash upstream of the powdered activated carbon introduction thereby keeping the ash uncontaminated with powdered activated carbon.

Referring again to mercury receiving receptacle 60, if desired, the desorbed mercury may be collected and concentrated in carbon filters such as the sulfur impregnated carbon available under the trade designation Calgon HGR.

EXAMPLE

In order to provide additional understanding of the invention, an example will be considered. Powdered activated carbon (NORIT Americas type Darco FGD) was employed in the process shown in the Figure with the blended mercury containing exhaust gas blended with the powdered activated carbon passing through fine particle filter 20 and into desorption unit 40 wherein it was processed for 30 minutes at 400° C. in a pure nitrogen atmosphere. The starting powdered activated carbon introduced to fine particle filter 20 contained 6.4 ppm mercury. After processing, the carbon contained <0.1 ppm mercury.

It will be appreciated that the foregoing provides a means for handling powdered activated carbon and reuse or combustion of the same, thereby eliminating offsite disposal thereof. In addition, the separated mercury produces a separated mercury metal product that is saleable with the nonhazardous process residue contained within exhaust gas 34 containing essentially no mercury and being more readily safely disposed of.

Whereas particular embodiments of the invention have been described herein for purposes of illustration, it will be evident to those skilled in the art, that numerous variations of the details may be made without departing from the invention as set forth in the appended claims.

The invention claimed is:

1. A method of removing mercury from a coal fired power plant exhaust gas comprising
   passing said exhaust gas through a bulk particle collection device to remove a plurality of coarse particles using a coarse particle filter,
   introducing powdered activated carbon into said exhaust gas downstream of said bulk particle collection device,
   introducing said powdered activated carbon and said exhaust gas into a fine particle filter to separate mercury containing powdered activated carbon from said exhaust gas,
   separating said powdered activated carbon from said mercury at an elevated temperature and in an inert gas environment, and
   introducing said powdered activated carbon into said exhaust gas upstream from said fine particle filter.

2. The method of claim 1 including
   subsequent to separating said powdered activated carbon from said mercury and said inert gas separating said mercury from said inert gas.

3. The method of claim 2 including separating said powered activated
   effecting a carbon from said mercury by desorption of said activated carbon at a temperature of about 300 to 500° C. for about 5 to 60 minutes.

4. The method of claim 3 including effecting said desorption in a continuous process.

5. The method of claim 4 including
   after separation of said mercury from said inert gas introducing said inert gas into said exhaust gas upstream of said fine particle filter.

6. The method of claim 3 including
   introducing at least a portion of said activated carbon into a combustion chamber of said coal fired process plant.

7. The method of claim 1 including employing said method on said exhaust having about 1 to 1000 ppm of mercury.

8. The method of claim 1 including
recirculating at least a portion of said mercury containing powdered activated carbon into said exhaust gas upstream of said fine particle filter.

9. The method of claim 1 including employing nitrogen as said inert gas.

10. The method of claim 1 including removing ash from said coarse particles in said coarse particle filter.

11. The method of claim 2 including employing said method on mercury containing exhaust gas having mercury in an amount of about 1 to 1000 ppm to about 1–10 micrograms per cubic meter of said exhaust gas.

12. The method of claim 1 including employing in said bulk particle collection device a coarse filter.

13. The method of claim 1 including employing in said bulk particle collection device an electrostatic precipitator.

14. Apparatus for recovering mercury from an exhaust gas from a coal fired power plant comprising
a bulk particle collection device having a coarse particle filter for removing coarse particles from said exhaust gas,
a fine particle filter disposed downstream of said coarse particle filter,
a carbon source for introducing powdered activated carbon into said exhaust gas between said coarse particle filter and said fine particle filter,
said fine particle filter being structured to separate mercury containing powdered activated carbon from said exhaust gas,
a desorption unit for separating said powdered activated carbon from said mercury in an inert gas environment, and
recirculating said powder activated carbon through said exhaust gas between said coarse particle filter and said fine particle filter.

15. The apparatus of claim 14 including
a separation unit for separating mercury from said inert gas received from said desorption unit.

16. The apparatus of claim 14 including
said desorption unit being structured to effect a desorption at a temperature of about 300 to 500° C. for about 5 to 60 minutes.

17. The apparatus of claim 14 including
said desorption unit structured to effect a desorption as a continuous process.

18. The apparatus of claim 15 including
said separation unit being structured to deliver said inert gas to said exhaust gas.

19. The apparatus of claim 14 including
said desorption unit being structured to effect separation of mercury from said powdered activated carbon in mercury amounts of about 1 to 1000 ppm.

20. The apparatus of claim 14 including
said coarse particle filter being structured to remove said coarse particles containing ash from said exhaust gas.

21. The apparatus of claim 14 including
a first conduit for delivering powdered activated carbon from said desorption unit to said exhaust gas intermediate said coarse particle filter and said fine particle filter.

22. The apparatus of claim 14 including
a second conduit for delivering powdered activated carbon separated in said desorption unit to a combustion unit of said coal fired power plant.

23. The apparatus of claim 15 including
said desorption unit being structured to effect separation of mercury from said powdered activated carbon in mercury amounts of about 1 to 1000 ppm to about 1–10 micrograms per cubic foot of said exhaust gas.

24. The apparatus of claim 14 including
said bulk particle collection device having a coarse filter.

25. The apparatus of claim 14 including
said bulk particle collection device having an electrostatic precipitator.

* * * * *

UNITED STATES PATENT AND TRADEMARK OFFICE
CERTIFICATE OF CORRECTION

| | |
|---|---|
| PATENT NO. | : 7,048,779 B1 |
| APPLICATION NO. | : 10/720584 |
| DATED | : May 23, 2006 |
| INVENTOR(S) | : Thomas Weyand et al. |

It is certified that error appears in the above-identified patent and that said Letters Patent is hereby corrected as shown below:

Col. 1, line 34, "absorbent" should read --sorbent--.

Col. 4, line 50 after "including", start a new paragraph.

Col. 4, line 51, after "activated" insert,
    -- carbon from said mercury by--.

Col. 4, line 52, delete "carbon from said mercury by".

Col. 4, line 55, after "including", start a new paragraph.

Col. 4, line 65, after "including" start a new paragraph.

Col. 4, line 66, after "exhaust", insert --gas--.

Col. 5, lines 5, 7, 9, 13 and 15, after "including" start a new paragraph.

Col. 6, line 2, delete "a".

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

PATENT NO.       : 7,048,779 B1
APPLICATION NO.  : 10/720589
DATED            : May 23, 2006
INVENTOR(S)      : Thomas Weyand et al.

It is certified that error appears in the above-identified patent and that said Letters Patent is hereby corrected as shown below:

Col. 1, line 34, "absorbent" should read --sorbent--.

Col. 4, line 50 after "including", start a new paragraph.

Col. 4, line 51, after "activated" insert,
    -- carbon from said mercury by--.

Col. 4, line 52, delete "carbon from said mercury by".

Col. 4, line 55, after "including", start a new paragraph.

Col. 4, line 65, after "including" start a new paragraph.

Col. 4, line 66, after "exhaust", insert --gas--.

Col. 5, lines 5, 7, 9, 13 and 15, after "including" start a new paragraph.

Col. 6, line 2, delete "a".

This certificate supersedes Certificate of Correction issued August 29, 2006.

Signed and Sealed this

Seventh Day of November, 2006

JON W. DUDAS
*Director of the United States Patent and Trademark Office*